United States Patent [19]

Taylor et al.

[11] Patent Number: 4,487,615
[45] Date of Patent: Dec. 11, 1984

[54] METHOD OF REDUCING MINE DUST

[75] Inventors: Larry D. Taylor, Morgantown; David M. Miller, Metz; Pramod C. Thakur, Morgantown, all of W. Va.

[73] Assignee: Conoco Inc., Ponca City, Okla.

[21] Appl. No.: 504,031

[22] Filed: Jun. 13, 1983
[51] Int. Cl.[3] ........................ B01D 47/00; C09K 3/22
[52] U.S. Cl. .......................................... 55/84; 252/88; 55/94
[58] Field of Search ........................ 55/84, 94; 252/88

[56] References Cited

U.S. PATENT DOCUMENTS 3,325,973 6/1967 Illingworth ............................ 55/90
3,757,491 9/1973 Gourdine ............................ 55/107
4,038,443 7/1977 Jacoby ............................ 252/88 X
4,136,050 1/1979 Brehm ............................ 252/88 X
4,316,811 2/1982 Burns et al. ............................ 252/88
4,428,984 1/1984 Shimizu et al. .................. 252/88 X

FOREIGN PATENT DOCUMENTS 934054 6/1982 U.S.S.R. ............................ 252/88

*Primary Examiner*—Charles Hart
*Attorney, Agent, or Firm*—Richard W. Collins

[57] ABSTRACT

Respirable dust particles in air are reduced by spraying with water from high pressure spray nozzles. The removal of particles in the size range most likely to cause pathological damage is enhanced by addition of a surfactant to the spray water.

1 Claim, 1 Drawing Figure

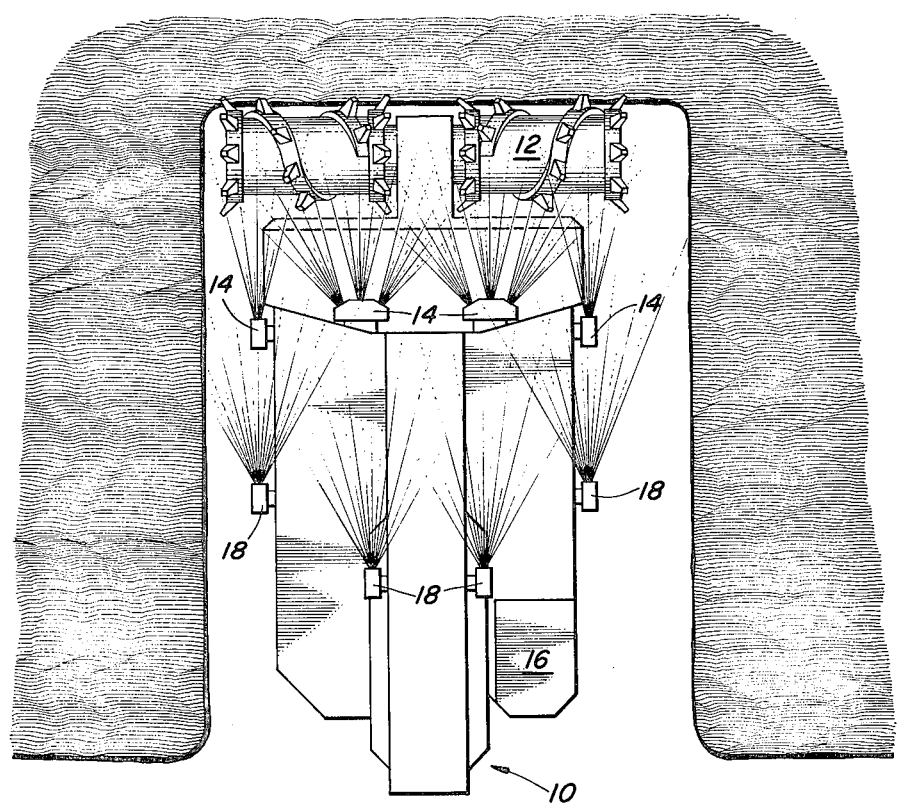

METHOD OF REDUCING MINE DUST

BACKGROUND OF THE INVENTION

1. Field of the Invention

This invention relates to the removal of potentially damging airborne respirable dust particles, particularly from working areas of coal mines or other facilities where potentially damaging dust particles are present.

2. The Prior Art

It is common practice to use water sprays to reduce dust levels in mining operations. For example, low pressure sprays or "foggers" are routinely used with continuous mining machines to protect the machine operators from dust generated by the action of the mining machines.

A system for reducing respirable dust in coal mines using electrically charged water particles is described in U.S. Pat. No. 3,757,491. Air-charged electrostatic foggers have good dust control capability, but they require a high voltage source and air compressors, and accordingly cannot be used in mines without special provisions related to safety regulations.

SUMMARY OF THE INVENTION

According to the present invention, dust control is provided by high pressure water spray techniques in which a surfactant is added to the spray water. The addition of a surfactant to the spray water provides dust control which is comparable to or better than that provided by electrostatic foggers, and does this without the need for a high voltage source, providing an inherently safer operation.

It is an object of the invention to control respirable dust effectively and safely.

THE DRAWINGS

FIG. 1 is a top plan view showing a continuous mining machine equipped for carrying out the dust control method of the invention.

DESCRIPTION OF THE PREFERRED EMBODIMENTS

A continuous mining machine 10 having a cutter head 12 and low pressure sprays 14 is shown in the drawing. Low pressure sprays 14 operate whenever the mining machine is cutting coal, and most of the time they are adequate to maintain the dust level around operator canopy 16 at a tolerable level. Occasionally, however, a dust cloud overwhelms the low pressure sprays and rolls back toward canopy 16. When this happens, high pressure sprays 18 mounted between the low pressure sprays and the canopy are activated.

The foregoing description is illustrative of one situation in which the improved spray technique of this invention is applicable. The technique is equally applicable in other operations such as at longwall faces and at transfer points in a mine.

As mentioned previously, it is known that electrostatic spray devices are effective in suppressing airborne dust particles. However, electrostatic sprayers require a high voltage source for their operation, and high voltage sources in coal mines are generally prohibited or strictly regulated, and it is obviously advantageous to eliminate the need for the high voltage source if comparable results can be obtained without it.

In accordance with this invention, it has been found that addition of a surfactant material to water which is fed to a high pressure spray device causes the spray to have an electrical charge comparable to the charge obtained by using an electrostatic sprayer.

To demonstrate the effectiveness of surfactant addition in producing an electrical charge on water particles from a high pressure spray ($\simeq$20 MPa), a test was performed wherein the electrical charge of spray particles at different distances from the spray nozzle was determined using plain water. Similar measurements were made after addition of 0.1 volume percent surfactant to the water prior to spraying. Still other measurements were made after addition of about 7 grams per liter of sodium chloride to both the plain water and the water containing surfactant. The results are tabulated in Table I below.

TABLE I

| | Voltages Measured in Spray (Volts) | | | |
|---|---|---|---|---|
| Distance From Nozzle | Pure $H_2O$ | NaCl Added | Surfactant* Added To Pure $H_2O$ | Surfactant Added To $H_2O$ Containing NaCl |
| 30.5 cm | +0.270 | +0.075 | +3.50 | +3.80 |
| 61 cm | +0.220 | +0.060 | +2.60 | +2.97 |
| 91.5 cm | +0.085 | +0.026 | +1.30 | +1.08 |
| 122 cm | +0.035 | +0.011 | +0.57 | +0.61 |
| 152.5 cm | +0.022 | +0.005 | +0.36 | +0.29 |

*ALFONIC 10–50 Surfactant - Described below

The performance of high pressure sprays of water plus surfactant and water plus surfactant and sodium chloride was compared to that of spray from an electrostatic fogger using water plus surfactant and water plus surfactant and sodium chloride. As seen in Table II below, the charges produced by the high pressure sprays were comparable to those produced from the electrostatic fogger which required a 13 kilovolt source.

TABLE II

| | Voltages Measured in Spray (Volts) | | | |
|---|---|---|---|---|
| | Air Charged Electrostatic Fogger @ 13 kv | | High Pressure Sprays** | |
| Distance From Spray | Surfactant* | Surfactant & NaCl*** | Surfactant | Surfactant & NaCl |
| 30.5 cm | +3.9 | +2.7 | +3.5 | +3.8 |
| 61 cm | +1.9 | +1.2 | +2.6 | +2.97 |
| 91.5 cm | +1.1 | +0.7 | +1.3 | +1.08 |
| 122 cm | +0.85 | +0.38 | +0.57 | +0.61 |
| 152.5 cm | +0.5 | +0.21 | +0.36 | +0.29 |

*ALFONIC 10-50 Surfactant, 0.1 Volume Percent
**20 MPa
***7 Grams/Liter

A further test compared the actual dust removing capability of sprays containing water plus surfactant and water plus sodium chloride and surfactant with sprays of plain water. The results are shown in Table III below. The collection efficiency of stages 4 and 5 particles is of particular importance because these particles are most likely to cause pathological damage. In Test 1, using plain water, the percent reduction of Stage 4 particles was 70 percent. Using the surfactant, a Stage 4 reduction of 88 percent was obtained, and using the surfactant plus sodium chloride, a 91 percent reduction was obtained. For Stage 5 particles, plain water produced a reduction of only 3 percent, whereas water plus surfactant produced an 85 percent reduction, and water plus surfactant and sodium chloride produced a 91 percent reduction. A nozzle pressure of about 20 MPa was used. The surfactant was ALFONIC 10-50 in a concentration of 0.1 volume percent. About 7 grams of sodium chloride per liter of water was used, and all measurements were made about 3 meters from the nozzle. Initial dust concentration was 30 mg/m$^3$.

TABLE III

| | | % REDUCTION PER STAGE | | | | | | |
|---|---|---|---|---|---|---|---|---|
| | | Stage | | | | | | |
| | | 1 | 2 | 3 | 4 | 5 | Dust | % |
| Test | Spray | Avg. Part. Size ($\mu$) | | | | | Conc | Reduction |
| No. | Composition | 10.1 | 6.8 | 4.5 | 3.1 | 1.8 | mg/m$^3$ | Total |
| 1 | Water | 95 | 96 | 93 | 70 | 03 | 13.5 | 91.8 |
| 2 | Surfactant Added | 92 | 96 | 98 | 88 | 85 | 15.1 | 90.9 |
| 3 | Surfactant and NaCl Added | 93 | 99 | 95 | 91 | 91 | 7.5 | 95.5 |

In all of the above tests, the surfactant used was a nonionic material produced by reacting ethylene oxide with linear primary alcohols. The reaction product had the formula $CH_3(CH_2)_xCH_2(OCH_2CH_2)_nOH$ where x is 8 and n is about 3.6. Such a material is available from Conoco Inc. under the tradename ALFONIC 10-50. Related alcohol ethyoxylates having the above structure where x ranges from 4 to 16 and n ranges from 3 to 11 may be used. Additionally, any surfactant which enhances the electrical charge of the spray and increases the effectiveness of dust removal compared to use of plain water may be used in this invention. The surfactant should be used in an amount sufficient to provide a spray having a charge which provides dust removal to a degree greater than that obtained by use of water spray alone. The amount of surfactant used in the tests was 0.1 volume percent. A preferred range is from 0.01 to 0.5 volume percent.

In some cases, use of sodium chloride in an amount of from 3 to 15 grams/liter further enhances the effectiveness of the spray.

A water pressure of 10 to 40 MPa is useful in the invention, and a pressure of about 20 MPa is preferred.

As will be appreciated, any number of spray nozzles could be used, depending on the particular application, and a preferred technique involves periodic "as needed" use of the high pressure sprays to supplement the conventional low pressure sprays.

Thus, the invention provides a high degree of removal of dust particles having a size range that is most likely to cause pathological damage, and accomplishes this without the need for a high voltage source such as would be needed if an electrostatic fogger were used.

The foregoing description of the preferred embodiments of the invention is intended to be illustrative rather than limiting of the invention, which is to be defined by the appended claims.

We claim:

1. In a method of collecting airborne respirable dust particles from working areas of coal mines by spraying said dust particles with water from a spray nozzle, the improvement comprising:

adding to said water, prior to passing said water at a pressure of from 10 to 40 MPa through said spray nozzle, a surfactant having the formula $CH_3(CH_2)_xCH_2(OCH_2CH_2)_nOH$ where x ranges from 4 to 16 and n ranges from about 3 to 11, said surfactant being added in an amount of from 0.01 to 0.5 volume percent, said amount of surfactant being sufficient to enhance the electrical charge of spray from said nozzle, thereby reducing the amount of stage 4 and stage 5 dust particles substantially more than said stage 4 and stage 5 dust particles would be reduced in the absence of said surfactant.

* * * * *